Feb. 20, 1968 J. J. SCHELL, JR 3,370,276

COMPUTER PERIPHERAL DEVICE CONTROL

Filed May 5, 1965 2 Sheets-Sheet 1

INVENTOR
JAMES J. SCHELL, JR.
BY
Carl V. Olson
Attorney

INVENTOR.
JAMES J. SCHELL, JR.
BY
Carl V. Olson
Attorney

United States Patent Office 3,370,276

Patented Feb. 20, 1968

3,370,276

COMPUTER PERIPHERAL DEVICE CONTROL

James J. Schell, Jr., N. Palm Beach, Fla., assignor to Radio Corporation of America, a corporation of Delaware Filed May 5, 1965, Ser. No. 453,254
7 Claims. (Cl. 340—172.5)

Figure 1:
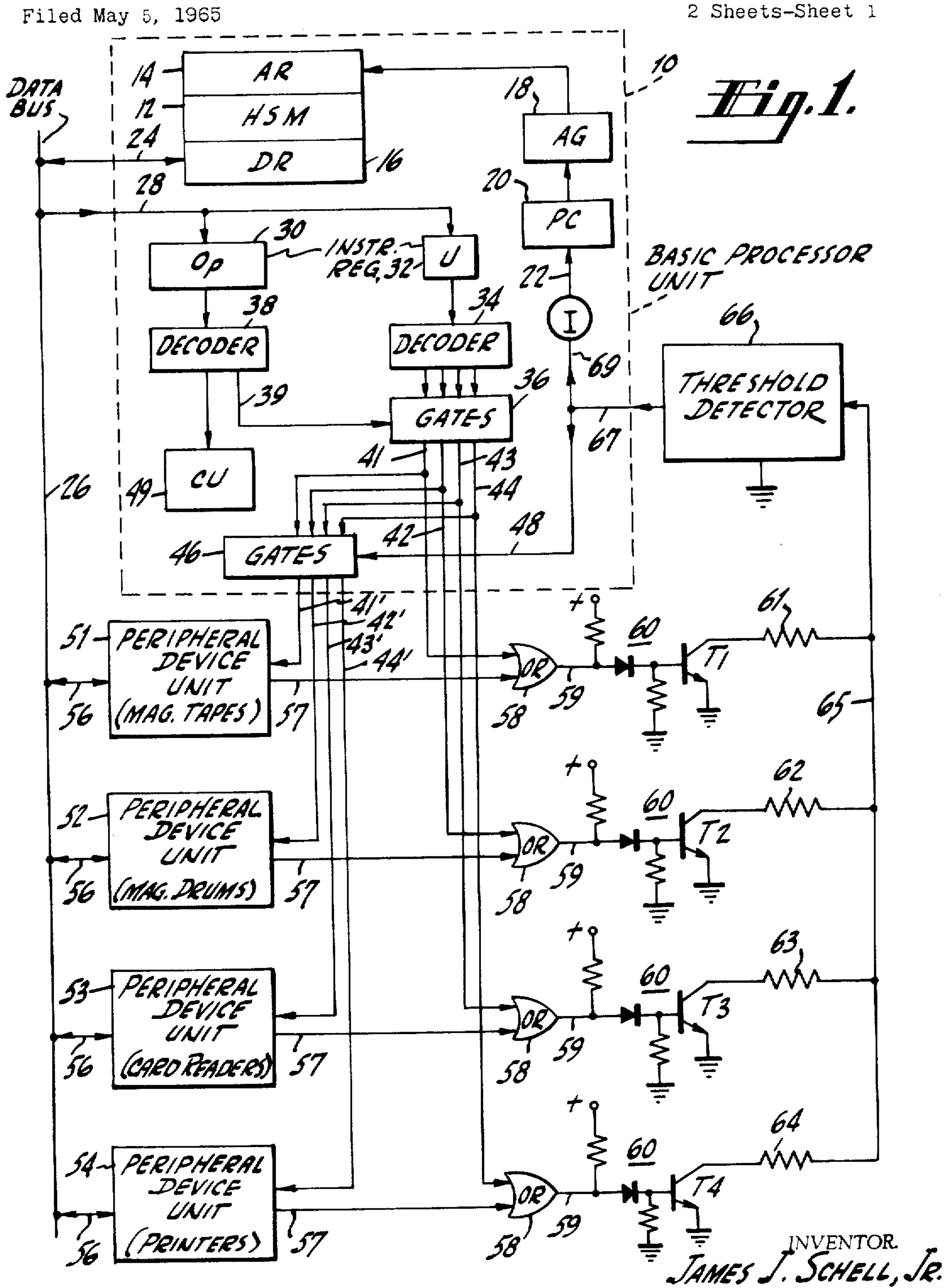

This invention relates to computers, and particularly to means for controlling communications between the basic processor unit of a computer and a plurality of peripheral input-output devices such as magnetic tape stations, magnetic drums, card and paper tape punchers and readers, printers, etc.

A computer basic processor unit is normally capable of receiving and supplying data at much higher rates than the peripheral input-output devices. Because of this data-handling speed disparity, the basic processor unit can proceed with the execution of its stored program except for periodic interruptions to exchange data with one or more continuously-running peripheral units. However, computer systems commonly include such a large number of peripheral units that the basic processor's capability to service the peripheral devices is exceeded if all or a large number of the peripheral devices are running at the same time. The number of peripheral devices which can be running and be serviced by the central processor unit without loss of data is affected by the data handling speeds of the peripheral devices. The data handling speeds of peripheral devices vary considerably in accordance with limitations imposed by their respective mechanical mechanisms. Therefore, the basic processors may be capable of servicing a large number of low-speed peripheral devices, only a small number of high-speed peripheral devices, or an intermediate number of mixed low-speed and high-speed peripheral devices.

The energization of a greater number of mixed-speed peripheral devices than can be serviced by the basic processor unit may be prevented by assigning a relative "speed-weight number," consisting of binary digits, to each peripheral device. When a peripheral device is energized, the corresponding speed-weight number is stored. Then, when an additional peripheral device is to be energized, its speed-weight number and the stored speed-weight are added. The resulting sum is then compared with a processor-capability number to determine whether the additional peripheral device will overload the processor. The described procedure requires either a large amount of special-purpose hardware, or a large amount of main memoy space and computer time.

It is therefore a general object of this invention to provide a computer system having an improved means for preventing the energization of a peripheral device when its energization would cause an overloading of the basic processor unit's ability to service the peripheral units.

In accordance with an example of the invention, there is provided a basic processor unit having start request outputs for each of a corresponding number of peripheral device units, and a current threshold detector circuit having a common input terminal. A plurality of peripheral device units each have a busy signal output connected through an "or" gate, a transistor switch circuit and a resistor to the common input terminal of the threshold detector circuit. The resistor associated with each peripheral device unit has a value indicative of the proportion of the basic processor unit's time required in the servicing of the corresponding peripheral device unit. Each start request output from the basic processor unit is coupled to the input of the "or" gate associated with the corresponding one of the peripheral device units. The output of the threshold detector circuit is applied to the basic processor unit to inhibit the energization of a peripheral device unit if the time required for time-interlaced servicing of the peripheral device unit, when added to the time required for servicing already-energized peripheral device units, would exceed the basic processor unit's capability.

Figure 2:
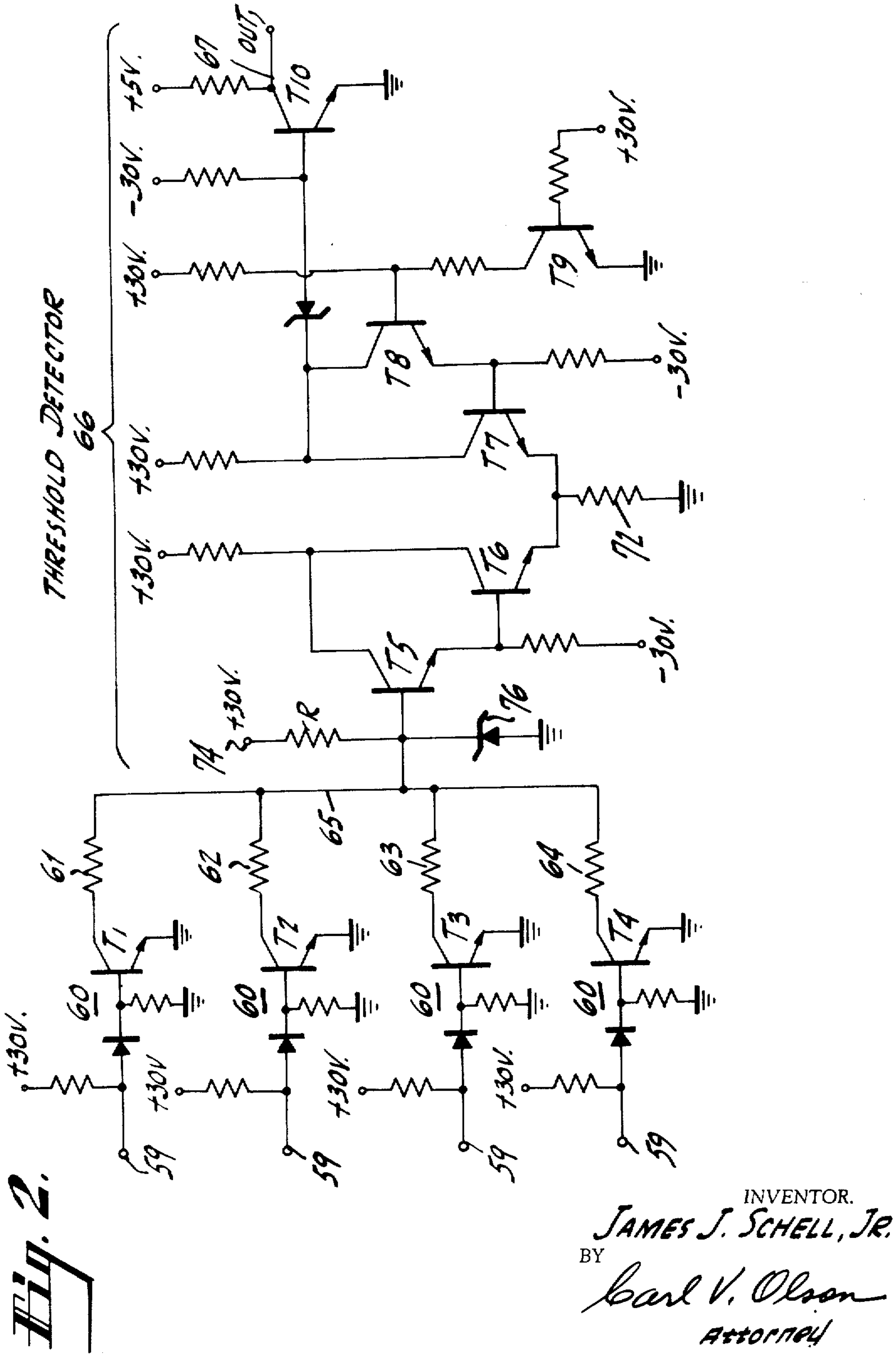

In the drawing:

FIG. 1 is a block diagram of a computer system constructed according to the teachings of the invention; and FIG. 2 is a circuit diagram of a portion of the block diagram of FIG. 1.

Referring now in greater detail to FIG. 1 of the drawing, there is shown a computer basic processor unit 10 including a high speed main memory 12 having an address register 14 and a data register 16. The address register 14 is connected to receive an address from an address generator 18 which may be controlled by a program counter 20. The program counter 20 has a decrementing input 22 for restoring the count therein to a count representing the address of a preceding instruction. The data register 16 is connected by lines 24 to a data bus 26.

The data bus 26 is connected by lines 28 to inputs of an instruction register including an operation code register 30 and a register 32 used as a peripheral unit register when the instruction is one involving a peripheral device. The contents of register 32 is coupled to decoder 34 having four outputs any one of which is energized at a time to represent a start request for any one of a corresponding number of peripheral device units. The outputs of decoder 34 are connected through gates 36 having outputs 41, 42, 43 and 44. The operation code register 30 is connected to a decoder 38 having an output 39 connected to enable gates 36 when the operation code supplied to decoder 38 is the operation code of one of a number of input-output instructions. Such input-output instructions may include instructions for erase, read forward, read reverse, sense, write and write control. Gates 46 have inputs coupled to the outputs 41, 42, 43 and 44 of gates 36. Gates 46 have corresponding start request signal output lines 41', 42', 43' and 44'. Gates 46 also have an enabling-inhibiting input 48. The four lines 41, 42, 43 and 44 and the four lines 41', 42', 43' and 44' are for carrying start request signals for four corresponding peripheral device units. The quantity "four" of peripheral device units is used merely to illustrate a plurality of units. A control unit 49 represents remaining conventional units in the basic processor unit 10. There are, of course, many conventional cross connections (not shown in addition to those which are shown for the purpose of illustrating the invention.

A plurality of peripheral input-output device units 51, 52, 53 and 54 are each connected over respective lines 56 to the data bus 26 for transmission and reception of data. Each peripheral device unit includes a conventional peripheral input-output device and associated control circuitry. Each peripheral device unit may include one or more similar peripheral input-output devices. For example, peripheral device unit 51 may include one or more magnetic tape stations, unit 52 may include one or more magnetic drum storage units, unit 53 may include one or more punched card readers and unit 54 may include one or more line printers. If a plurality of similar peripheral input-output devices are included in a peripheral device unit, only one of the devices is used at a time. If a plurality of similar devices, such as tape stations, are to be operated at the same time, they are included in separate peripheral device units.

Each peripheral device unit 51, 52, 53 and 54 has an input connected to a respective start request line 41', 42', 43' and 44'. Additional conventional control connections (not shown) may be provided between the peripheral device units and the basic processor unit 10. Each peripheral device unit also has an individual busy signal output connected over a respective line 57 to an input of a respective "or" gate 58. Each "or" gate 58 also has an input from a respective one of the start request lines 41, 42, 43 and 44. Each "or" gate 58 has an output 59 connected through a respective switch circuit 60 and a respective speed-weight resistor 61, 62, 63 or 64 to a summing bus 65. Each of the speed-weight resistors 61, 62, 63 and 64 has a value indicative of the proportion of the basic processor unit's time required in the servicing of the corresponding respective peripheral device units 51, 52, 53 and 54. The speed-weight resistors 61, 62, 63 and 64 have values which are inversely proportional to the time required for their time-interlaced servicing by the basic processor unit 10. The summing bus 65 is connected to a common signal input terminal of a current threshold detector 66. The detector 66 has an output 67 which is connected over line 48 to an inhibit input of gates 46 and over line 69 and through inverter I to the decrementing input 22 of program counter 20.

Reference is now made to FIG. 2 for a description in greater detail of the switch circuits 60, the speed-weight resistors 61, 62, 63 and 64, and the current threshold detector 66. The threshold detector 66 includes a threshold transistor T7 and an input transistor T6 both of which have a common emitter resistor 72 so that an increase in conduction through one transistor causes a reduction of conduction through the other transistor. Transistors T5 and T6 are connected as a so-called Darlington pair, as are transistors T7 and T8. A constant reference threshold potential is supplied to the base of threshold transistor T7 by the circuits of transistors T8 and T9. The input potential applied to the base of input transistor T6 is determined by the current flowing through resistor R. (There is only a slight voltage drop across the base-emitter junction of transistor T5.) The amount of current flowing through resistor R is, in turn, affected by the conductive states of switch transistors T1, T2, T3 and T4 in switch circuits 60. The current through the resistors 61, 62, 63 and 64 may be traced through the path starting at the +30 volt terminal 74, going through the resistor R, and the summing bus 65, and branching through some of the resistors 61, 62, 63 and 64 and the collector-emitter paths of corresponding ones of transistors T1, T2, T3 and T4 to ground.

Threshold transistor T7 is normally "off," and input transistor T6 is normally "on" due to current in the voltage divider circuit including resistor R and zener diode 76. Input transistor T6 remains "on" unless or until the sum of the currents drawn by transistors T1, T2, T3 and T4 through resistor R cause the potential at the base of transistor T5 and the base of transistor T6 to fall to a value which is lower than the value of the reference potential on the base of threshold transistor T7. This causes a reduced current from transistor T6 through the common emitter resistor 72, which switches threshold transistor T7 to its conductive state. The output of threshold transistor T7 energizes ouput transistor T10 to provide an ouput signal at 67.

Reference is now made to FIG. 1 for a description of the operation of the computer system. It is initially assumed that none of the peripheral device units 51, 52, 53 and 54 are running and that the basic processor unit 10 is proceeding with the execution of instructions of a program stored in the high speed memory 12. Each instruction in the memory is addressed by an address supplied from address generator 18 to the address register 14 of the memory. The addressed instruction is transferred from its storage location in memory 12 to the memory data register 16 from which it is supplied over lines 24 to the data bus 26, and then over lines 28 to the instruction register including the operation code register 30 and the unit register 32.

If the instruction thus staticized is an instruction involving a peripheral input-output device unit 51, 52, 53 or 54, the decoder 38 recognizes a peripheral device operation code in the operation code register 30 and energizes its output 39 to enable gates 36. The decoder 34 recognizes the particular peripheral device unit called for by the instruction from the contents of the unit register 32. The corresponding energized one of the start request outputs of decoder 34, for example output 41, passes through enabled gates 36 to an input of the corresponding one of the "or" gates 58. The signal passed through the energized "or" gate activates the corresponding switch 60 and causes a current flow through the transistor T1 and the associated speed-weight resistor 61. The magnitude or value of the current drawn by the transistor T1 through the speed-weight resistor 61 is determined by the value of the resistor, and the current is proportional to the percentage of the basic processor's total time required in the time-interlaced servicing of the associated peripheral unit 51. The current thus drawn from the input of the threshold detector 66 is not enough to exceed the threshold of the detector and no inhibiting output signal is generated and applied over lines 67 and 48 to the gates 46.

The start request signal on output 41 of gates 36 is then passed through gates 46 and over line 41' to start or activate the peripheral device unit 51. The activated peripheral device unit thereafter supplies a busy signal over its line 57, through the associated "or" gate 58 to the corresponding switch circuit 60. The switch circuit transistor T1 thereafter continues to draw current through the speed-weight resistor 61 so long as the peripheral device remains running.

The computer proceeds with servicing of the energized peripheral device unit 51 in time-interlaced fashion with the execution of its stored program. The computer then may reach another instruction calling for communication with another one of the peripheral device units, for example unit 53. The resulting start request output 43 from the gates 36 is applied to the corresponding switch circuit 60 including transistor T3 and the speed-weight resistor 63 to increase the current drawn from the input of the threshold detector 66. If the total current drawn by the transistor T1 associated with the already-energized peripheral device unit 51 and the transistor T3 associated with the presently-interrogated peripheral device unit 53 does not exceed the threshold of the threshold detector 66, the second peripheral device unit 53 is also activated and serviced in time-interlaced fashion.

The computer may then reach an instruction involving a third peripheral device unit such as unit 54, and the energization of the corresponding switch circuit 60 and speed-weight resistor 64 may cause a total current flow from the input of the threshold detector 66 which extends the preset current reference threshold of the detector. In this case, the detector 66 provides an output on lines 67 and 48 which inhibits gates 46 and prevents the enrgization or activation of the corresponding peripheral device unit 54. At the same time, the output at 67 from the threshold detector 66 is applied over line 69 and through inverter I to the decrementing input 22 of program counter 20. This causes the computer to recycle through a preceding instruction, after which the computer again accesses the peripheral device instruction just previously prevented from being executed. The computer can thus operate in an idling loop until one of the busy peripheral device units finishes its work and stops running. When this happens, the start request signal for the third peripheral device unit 64 will be accepted if sufficient processor time is available for its servicing. The closed idling loop arrangement of the computer may include provisions permitting interruption for the performance of a program or routine not involving a peripheral device unit.

The operation of the system is such that an instruction requesting communication with a peripheral device unit will be executed only if the time required by the basic processor unit for time-interlaced servicing of the peripheral device unit, when added to the time required for servicing already-energized peripheral device units, will not exceed the basic processor unit's capability. The number of peripheral device units permitted to be simultaneously operative depends on the time required for their servicing. The simultaneously-running peripheral device units may include a large number of slow-speed units, a relatively small number of high-speed units, or an intermediate number of mixed high-speed and low-speed units.

What is claimed is:

1. The combination of
a threshold detector circuit,
a plurality of peripheral device units,
an analog circuit for each of said peripheral device units, each analog circuit when energized having an output signal amplitude coupled to said threshold detector circuit which is indicative of the speed of operation of the corresponding peripheral device unit,
means to energize each analog circuit when the corresponding peripheral device unit is active and when the corresponding peripheral device is desired to be made active, and
means under control of said threshold detector circuit conditionally to inhibit activation of a peripheral device unit desiring to be made active.

2. The combination of
a source of start signals for each of a corresponding number of peripheral device units,
a threshold detector circuit having a common input terminal,
a plurality of peripheral device units each having a start signal input and a busy signal output,
an analog circuit for each of said peripheral device units, each analog circuit having an input coupled to receive a corresponding start signal, having an input coupled to receive a corresponding busy signal, and having an output coupled to the common input terminal of said threshold detector, each analog circuit responding to one or the other or both of said signals to generate an output signal value indicative of the speed of operation of the corresponding peripheral device unit, and
means under control of the output of said threshold detector circuit conditionally to couple start signals to said peripheral device units.

3. The combination of
a basic processor unit having start request outputs for each of a corresponding number of peripheral device units,
a threshold detector circuit having a common input terminal,
a plurality of peripheral device units each having a busy signal output,
an analog circuit for each of said peripheral device units, each analog circuit having an input coupled to a corresponding start request output, having an input coupled to a corresopnding busy signal output, and having an output coupled to the common input terminal of said threshold detector, each analog circuit having an output signal value indicative of the proportion of the basic processor unit's time required in the servicing of the corresponding peripheral device unit, and
means under control of the output of said threshold detector circuit conditionally to couple said start request outputs of said basic processor unit to said peripheral device units.

4. The combination of
a basic processor unit having start request outputs for each of a corresponding number of peripheral device units,
a threshold detector circuit having a common input terminal,
a plurality of peripheral device units each having a busy signal output,
an analog circuit for each of said peripheral device units, each analog circuit having an input coupled to a corresponding start request output, having an input coupled to a corresponding busy signal output, and having an output coupled to the common input terminal of said threshold detector, each analog circuit having an output signal value indicative of the proportion of the basic processor unit's time required in the servicing of the corresponding peripheral device unit, and
means under control of the output of said threshold detector circuit to couple said start request outputs from said basic processor unit to said peripheral device units unless the time required for time-interlaced servicing of the peripheral device unit, when added to the time required for servicing already-energized peripheral device units, would exceed the basic processor unit's capability.

5. The combination of
a source of service signals for each of a corresponding number of peripheral device units,
a threshold detector circuit having a common input terminal,
a plurality of peripheral device units each having a start signal input and a busy signal output,
an analog circuit for each of said peripheral device units, each analog circuit including an "or" gate having inputs coupled to receive a corresponding start signal and to receive a corresponding busy signal, a transistor switch circuit having an input coupled to the output of said "or" gate and a resistor coupled from the output of said switch circuit to the common input terminal of said threshold detector circuit, said resistor having a value indicative of the speed of operation of the corresponding peripheral device unit, and
means under control of the output of said threshold detector circuit conditionally to couple start signals to said peripheral device units.

6. A computer system comprising
a basic processor unit having start request outputs for each of a corresponding number of peripheral device units,
a current threshold detector circuit having a common input terminal,
a plurality of peripheral device units each having a busy signal output,
an analog circuit for each of said peripheral device units, each analog circuit including an "or" gate having an input coupled to a corresponding busy signal output, a transistor switch circuit having an input coupled to the output of said "or" gate and a resistor coupled from the output of said switch circuit to the common input terminal of said threshold detector circuit, said resistor having a value indicative of the proportion of the basic processor unit's time required in the servicing of the corresponding peripheral device unit,
means to couple each start request output from said basic processor unit to an input of the "or" gate in the analog circuit of a corresponding one of said peripheral device units, and
means to couple the output of said threshold detector circuit to said basic processor unit to inhibit the energization of a peripheral device unit if the time required for time-interlaced servicing of the peripheral device unit, when added to the time required for servicing already-energized peripheral device units, would exceed the basic processor unit's capability.

7. A computer system comprising
a basic processor unit having an instruction register and an instruction decoder providing start request outputs for each of a corresponding number of peripheral device units,
a current threshold detector circuit having a common input terminal,
a plurality of peripheral device units each having a busy signal output,
an analog circuit for each of said peripheral device units, each analog circuit including an "or" gate having an input coupled to a corresponding busy signal output, a transistor switch circuit having an input coupled to the output of said "or" gate and a resistor coupled from the output of said switch circuit to the common input terminal of said threshold detector circuit, said resistor having a value indicative of the proportion of the basic processor unit's time required in the servicing of the corresponding peripheral device unit, means to couple each start request output from said instruction decoder to an input of the "or" gate in the analog circuit of a corresponding one of said peripheral device units, and means under control of the output of said threshold detector circuit to couple said start request outputs from said basic processor unit to said peripheral device units unless the time required for time-interlaced servicing of the peripheral device unit, when added to the time required for servicing already-energized peripheral device units, would exceed the basic processor unit's capability.

References Cited

UNITED STATES PATENTS

| | | | |
|---|---|---|---|
| 2,956,271 | 10/1960 | Keller | 340—347 |
| 3,293,612 | 12/1966 | Ling | 340—172.5 |
| 3,333,252 | 7/1967 | Shimabukuro | 340—172.5 |

ROBERT C. BAILEY, *Primary Examiner.*

R. B. ZACHE, *Assistant Examiner.*